US012243462B2

(12) United States Patent
Gopishankar et al.

(10) Patent No.: US 12,243,462 B2
(45) Date of Patent: Mar. 4, 2025

(54) SYSTEM TO DISPLAY GAMUT EXCURSION

(71) Applicant: Project Giants, LLC, Beaverton, OR (US)

(72) Inventors: Lakshmanan Gopishankar, Houston, TX (US); Arvind Madhav Nayak, Bangalore (IN); Brian C. Dunn, Portland, OR (US)

(73) Assignee: PROJECT GIANTS, LLC, Beaverton, OR (US)

( * ) Notice: Subject to any disclaimer, the term of this patent is extended or adjusted under 35 U.S.C. 154(b) by 0 days.

(21) Appl. No.: 17/975,433

(22) Filed: Oct. 27, 2022

(65) Prior Publication Data
US 2023/0139880 A1 May 4, 2023

(30) Foreign Application Priority Data
Oct. 29, 2021 (IN) .............................. 202111049484

(51) Int. Cl.
G09G 3/20 (2006.01)
(52) U.S. Cl.
CPC ... *G09G 3/2003* (2013.01); *G09G 2320/0666* (2013.01); *G09G 2320/0686* (2013.01)
(58) Field of Classification Search
CPC ............... G09G 3/2003; G09G 3/3413; G09G 2340/06; G09G 2320/0666; G09G 2320/0686; G09G 2320/0242
See application file for complete search history.

(56) References Cited

U.S. PATENT DOCUMENTS

| | | |
|---|---|---|
| 2004/0218044 A1 | 11/2004 | Baker |
| 2004/0257445 A1 | 12/2004 | Ivers |
| 2007/0024529 A1* | 2/2007 | Ben-David .......... G09G 3/3413 345/32 |
| 2007/0223018 A1* | 9/2007 | Lammers ............ H04N 1/6058 358/1.9 |
| 2008/0297531 A1 | 12/2008 | Ueyama |
| 2009/0261984 A1 | 10/2009 | Sugimoto |
| 2010/0007741 A1* | 1/2010 | Imamura ................ H04N 17/02 348/180 |
| 2017/0359490 A1* | 12/2017 | Mazzante ................ G06T 7/90 |
| 2019/0014312 A1 | 1/2019 | Hubbard et al. |
| 2020/0186680 A1* | 6/2020 | Morovic .................. H04N 1/60 |
| 2022/0139355 A1* | 5/2022 | Su ........................... G09G 5/06 345/590 |

OTHER PUBLICATIONS

International Search Report and Written Opinion of the International Searching Authority issued in International Application No. PCT/US2022/048086, mailed Feb. 28, 2023, 10 pages.

* cited by examiner

Primary Examiner — Yuzhen Shen
(74) Attorney, Agent, or Firm — Miller Nash LLP

(57) ABSTRACT

A test and measurement device includes a graphical display that may act as an adjunct to a CIE chromaticity diagram 100 when analyzing color images. The graphical display shows indications of excursions of pixel color that are outside the boundary of a selected gamut. The graphic display may show the indications of excursions relative to one or more reference points.

20 Claims, 7 Drawing Sheets

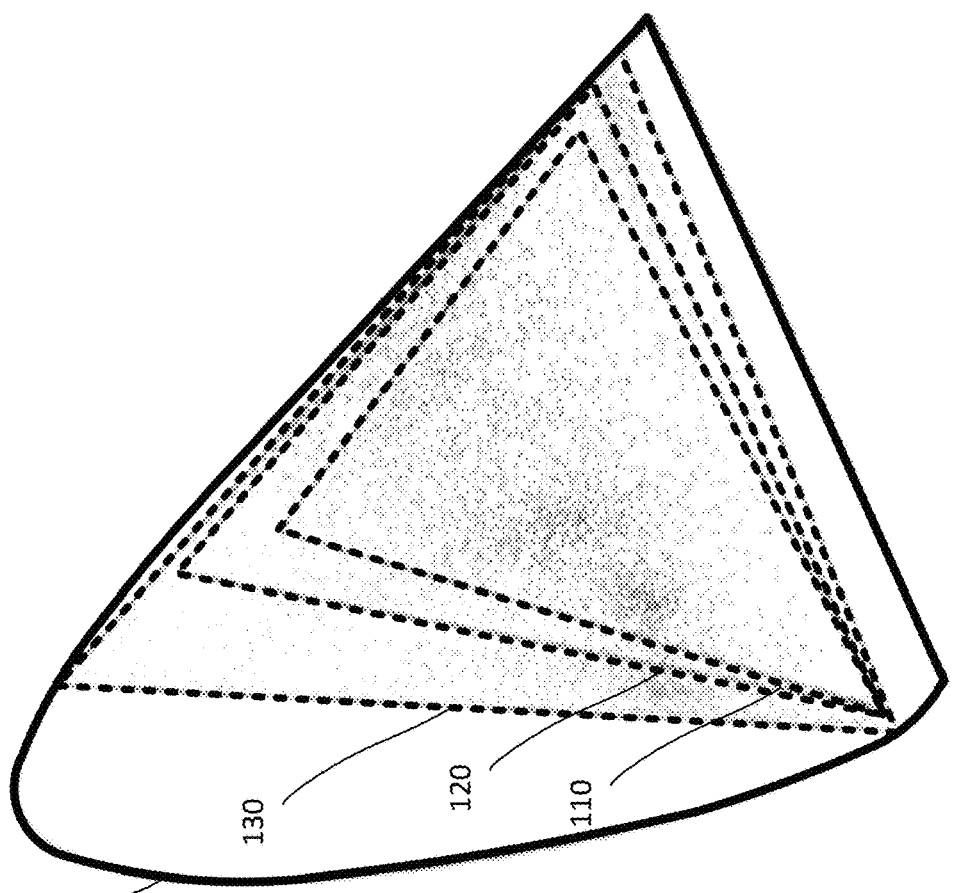
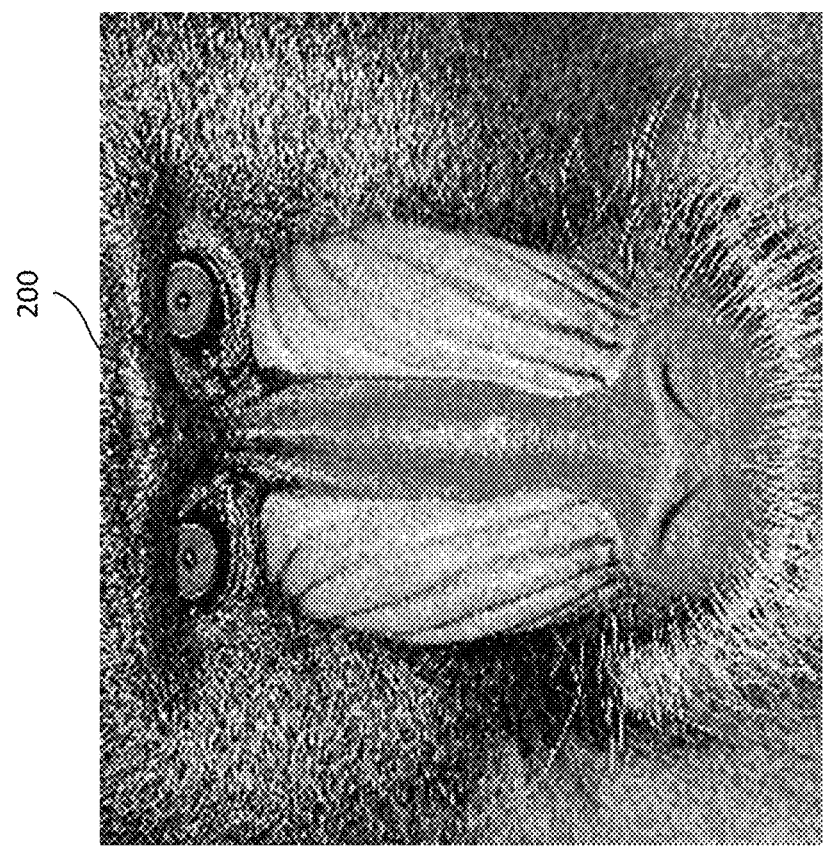
FIG. 2A
FIG. 2B

SYSTEM TO DISPLAY GAMUT EXCURSION

CROSS-REFERENCE TO RELATED APPLICATIONS

This application claims priority under 35 U.S.C. § 119 to Indian Provisional Patent Application 202111049484, filed Oct. 29, 2021, entitled SYSTEM TO DISPLAY GAMUT EXCURSION, the disclosure of which is incorporated by reference herein for all purposes.

FIELD OF THE DISCLOSURE

This disclosure relates to test and measurement devices, and, more particularly, to a system for measuring and reporting measurements of images and video.

BACKGROUND

The well-known CIE 1931 chromaticity diagram provides a straightforward way to visualize color in two dimensions, as illustrated by reference 100 in FIG. 1. The CIE 1931 chromaticity diagram was developed by the International Commission on Illumination in 1931 based on color observations of a set of ordinary observers. The two dimensions in the CIE chromaticity diagram 100 correspond to the x and y chromaticity values from the xyY color space, where x and y represent a color value and Y represents a luminance value. It is well known that the xyY color space is derived from the XYZ color space by normalizing the X, Y, and Z components against their sum. In the CIE chromaticity diagram 100, the xy values from the xyY three-dimensional color space are projected into a two-dimensional plane along the Y axis. Some versions of the CIE 1931 chromaticity diagram include internal colors, while others, such as the CIE chromaticity diagram 100 of FIG. 1, illustrate just the outlines of the color gamut visible to ordinary observers.

Whereas the CIE chromaticity diagram 100 of FIG. 1 illustrates the colors seen by the eyes of a standard observer, image-producing devices such as televisions, tablets, phones, computer monitors, and other types of displays generally do not display such a large color gamut. In fact, many color display and reproduction systems can represent only a small subset of the full chroma values shown in the CIE chromaticity diagram 100 of FIG. 1.

FIG. 1 also illustrates the bounds of three defined color gamuts, in this case ITU BT. 709 (a standard developed by International Telecommunication Union Radio communication Sector, reference 110), DCI-P3 (a Red Green Blue (RGB) color space developed by Digital Cinema Initiatives, reference 120) and ITU BT. 2020 (another standard developed by International Telecommunication Union Radio communication Sector, reference 130) superimposed on the entire 1931 chromaticity diagram 100. A defined color gamut, like the gamuts 110, 120, 130 illustrated in FIG. 1, shows the outer edges of colors that are produced in the particular gamut. Colors inside the CIE chromaticity diagram but outside the particular gamuts are not colors supported by the particular gamut. Note that the gamut for ITU BT. 2020 (130) is larger than the other two gamuts (120, 110). This means that a device that conforms to ITU BT. 2020 gamut 130 is able to faithfully reproduce more colors than the other illustrated gamuts. Conversely, gamut ITU BT. 709 (110) is the smallest of the three illustrated gamuts, and cannot faithfully produce as many colors as the other two illustrated gamuts (120, 130). A television or other display may be qualified on its ability to properly display an entire defined color gamut.

A good use case for the CIE chromaticity diagram 100 is in color grading during cinema/television post-production. For example, a colorist might look at the distribution of colors for a scene in a CIE chromaticity diagram to determine if all the colors are within the expected gamut (e.g. ITU BT.709) or whether the colors are at the expected chromaticity locations. The 'raw' content used by the colorist typically contains a wide gamut of colors, for example up to the boundary of the ITU BT.2020 gamut 130. The task of the colorist might be to grade the content in such a way that colors are remapped to within the DCI-P3 color gamut 120, such as for cinematic display.

One of the most cited problems when using the CIE chromaticity diagram 100 and gamut boundaries is the issue of determining how far off colors are from a gamut boundary of interest. If the colors are close to a gamut color boundary, the colorist might decide to allow the colors to be clipped to a color at the edge of the gamut rather than risk a hue shift with color mapping. The small area between the gamut triangles, such as illustrated in FIG. 1, makes it difficult for a colorist to accurately assess whether and by how much the color of a particular pixel making up an image may be outside a specific gamut boundary. For example, FIG. 2A is an example base image 200 (originally in color) and FIG. 2B is a chart illustrating the color location of the original color pixels making up the original FIG. 2A plotted on the CIE chromaticity diagram 100 and gamuts 110, 120, and 130 illustrated in FIG. 1. Note that plotting a frame of video to the CIE chromaticity diagram 100 is effected by mapping only the color expressed by each pixel in the frame to the chromaticity diagram, and not the location of the pixels making up the frame. Each pixel making up the base image 200 has a particular color, and that color is expressed as a single location on the CIE chromaticity diagram 100, or other chromaticity diagram. Mapping all of the colors of the pixels making a frame creates a collection of color dots, or pixels, on the chromaticity diagram. Because the CIE chromaticity diagram 100 includes all of the colors generally visible by humans, the colors of all of the pixels of any frame of video are able to be mapped to the CIE chromaticity diagram 100. But, because certain gamuts, which are predefined collections of colors, do not cover the entire CIE chromaticity diagram 100, as illustrated in FIG. 2B, it is possible that certain colors making an image may fall inside or outside of a particular gamut, even though all of the colors of the pixels making up a frame are represented somewhere on the CIE chromaticity diagram 100.

Note how difficult it is to see whether any of the individual pixels is within or outside of a particular gamut, such as the wide distribution of colors outside the BT.709 gamut boundary 110. As can be seen from the CIE chromaticity diagram 100 of FIG. 2B, it becomes difficult to estimate an amount of excursion outside the BT.709 gamut boundary 110, especially for colors closer to blue or red.

Additionally, the non-linear nature of the overlapping gamut boundaries makes it difficult, and less intuitive, for a colorist to have a global view of the color excursions outside a particular gamut boundary.

Embodiments of this disclosure address these and other limitations in the state of the art.

BRIEF DESCRIPTION OF THE DRAWINGS

FIG. 2A is an image to be analyzed.

FIG. 2B is a color chart for the image of FIG. 2A

DESCRIPTION

Figure 1:
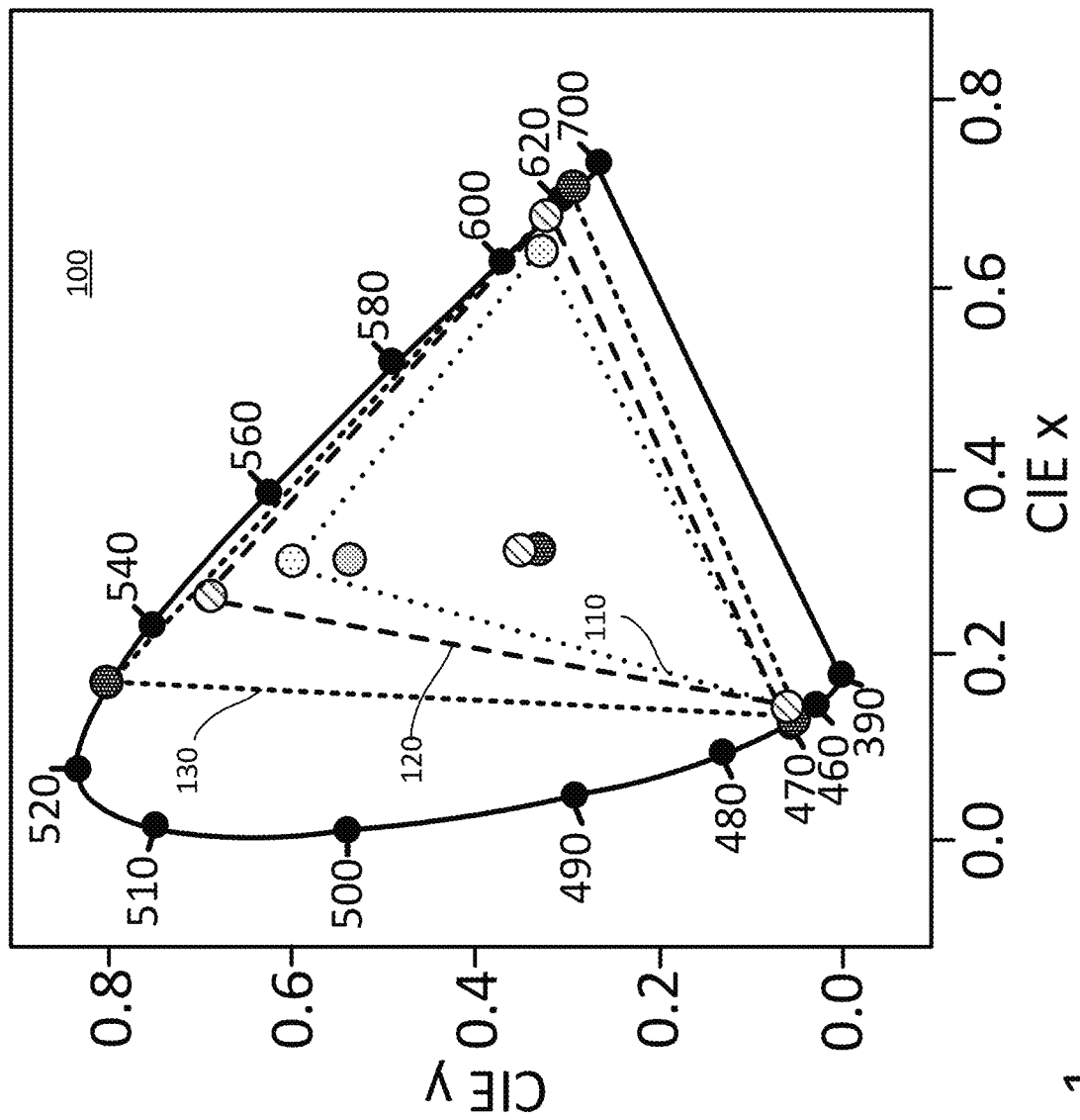
FIG. 1 is a chart illustrating the CIE 1931 Standard Observer Chromaticity Diagram on which three color gamuts have been superimposed, which may be used by embodiments of the disclosure.
Figure 3A:
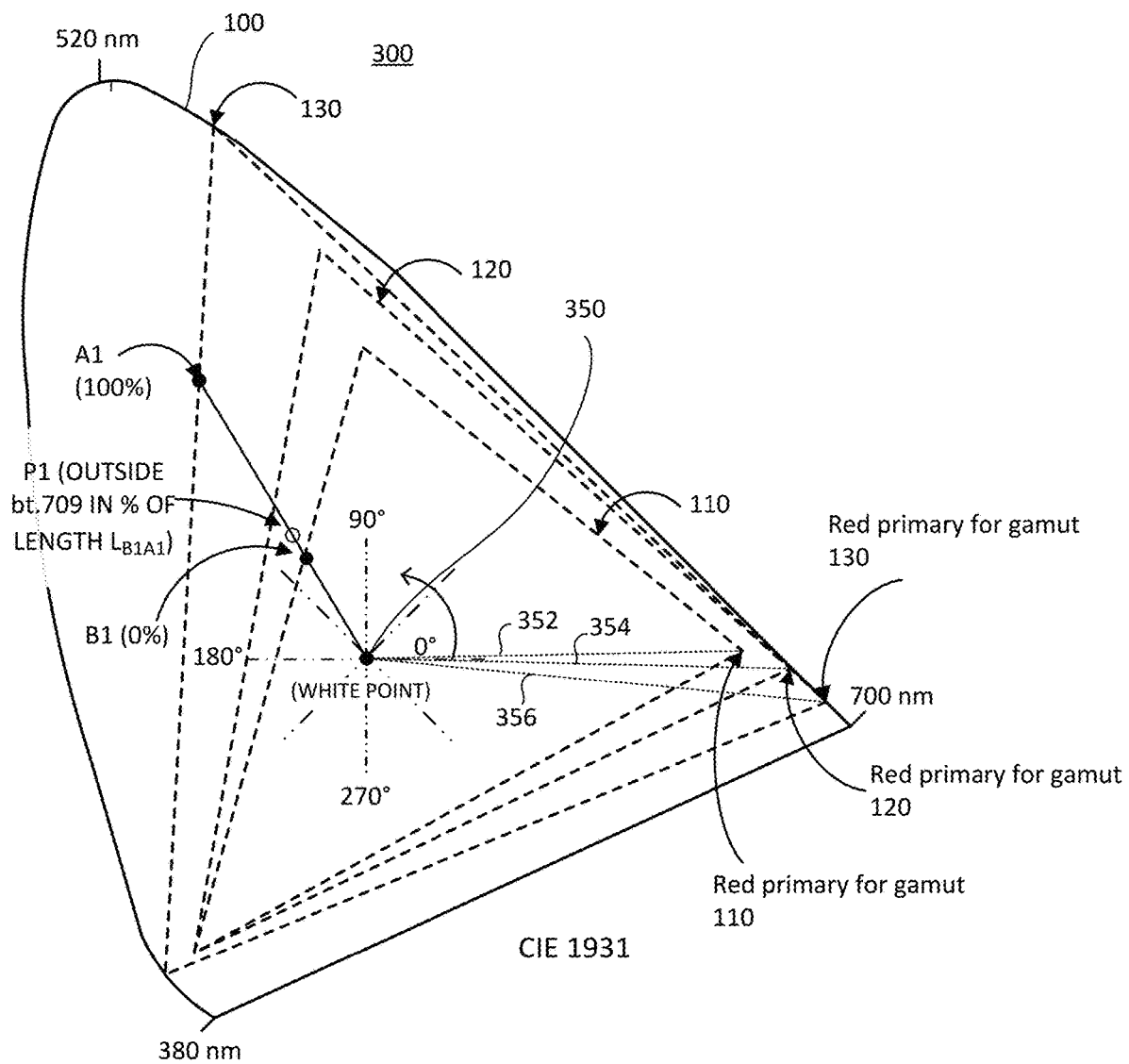
FIG. 3A is a chart illustrating an example color gamut excursion according to embodiments of the invention.
Figure 3B:
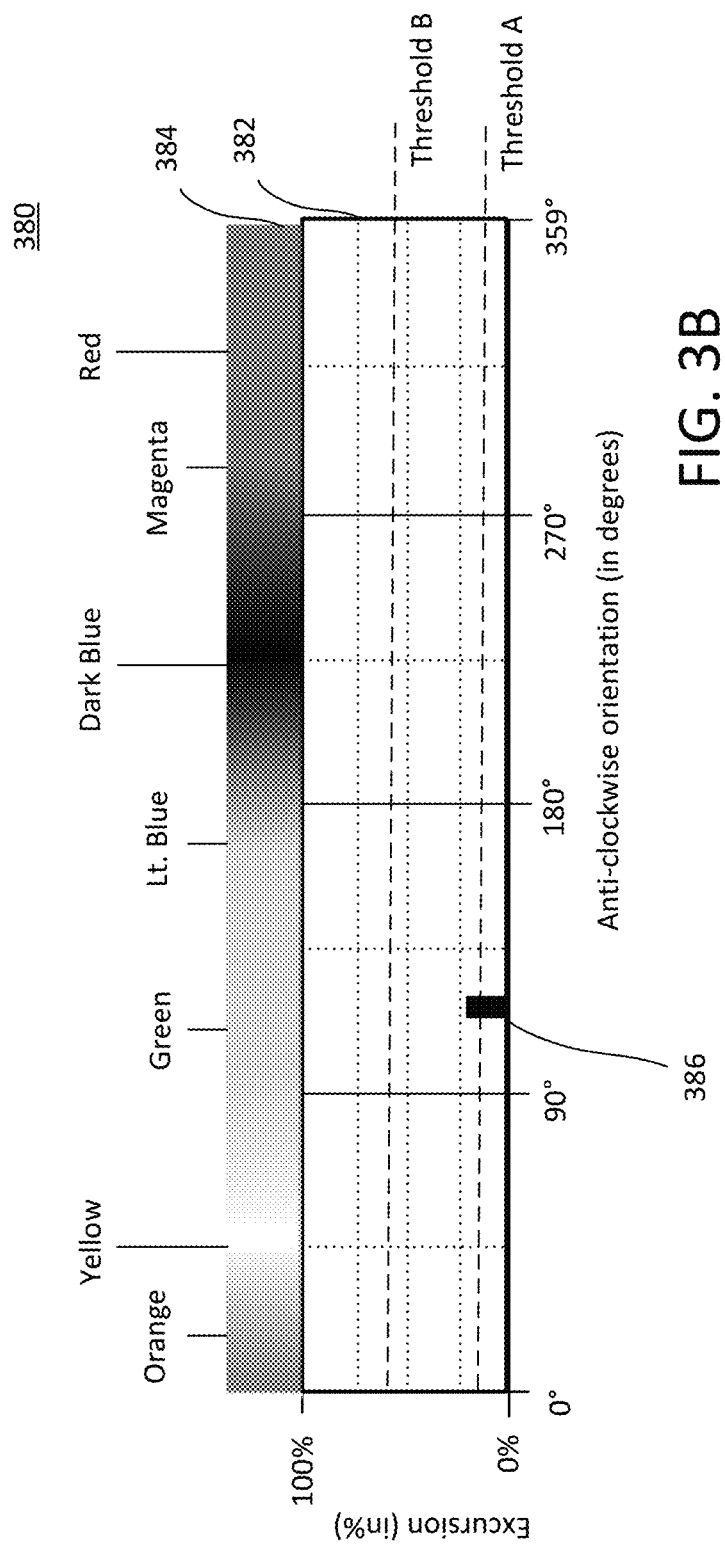
FIG. 3B is a graph illustrating a new method of communicating gamut excursion according to embodiments of the disclosure.

FIG. 3A is a diagram 300 illustrating an example color gamut excursion according to embodiments of the disclosure. Similar to the diagram of FIG. 1, the diagram 300 of FIG. 3A illustrates the outline of the CIE 1931 chromaticity diagram 100, as well as outlines for the ITU BT. 709 (110), DCI-P3 (120), and ITU BT. 2020 gamuts (130). Additionally, a white point 350 is illustrated near the center of the CIE 1931 chromaticity diagram 100. FIG. 3B is a graph 380 illustrating a new representation that visually communicates gamut excursion to a user according to embodiments of the disclosure, and is explained in detail below. In practice, the graph 380 may be produced on a display of a video analyzer, or other video measurement device.

For illustration purposes, assume that point P1 in FIG. 3A represents the color of a pixel of interest in an image. Note how P1 is outside of the BT. 709 gamut 110, but is within the BT. 2020 gamut 130 and DCI-P3 gamut 120. In general, embodiments disclosed herein generate, other than in a CIE chromaticity diagram, a separate display that indicates whether a color of interested is outside a gamut of interest. Further, if the color is, in fact, outside the gamut of interest, embodiments of the invention use the graph 380 of FIG. 3B to communicate which color the pixel is, and to what extent the color is outside the gamut. A user can then use the graph 380 of FIG. 3B help visualize and determine the extent of the color violation of the gamut.

The graph 380 of FIG. 3B includes a number of elements. First, a graph background 382 maps 0-359 degrees on its X-axis against a percent of excursion on its Y-axis. A color bar 384 (colored in the original) indicates a spectrum of colors from the CIE 1931 chromaticity diagram 100. From left to right, the primary colors represented in the color bar 384 span orange, yellow, green, light blue, dark blue, magenta, and red. As seen in FIG. 3B, the color bar 384 is a continuous spectrum of colors.

A user may use the graph 380 of FIG. 3B in a number of ways. For example, if the color of interest is merely a small amount outside the gamut of interest, a colorist may choose to allow the color to be clipped at the gamut, i.e, represented to the best degree possible, by the color at the edge of the particular gamut, even if it isn't the absolute actual color of the original pixel. Using embodiments of the invention, this decision may be made quickly and easily—and much more easily than searching for tiny pixels on a crowded gamut chart.

Referring back to FIG. 3A, embodiments of the disclosure construct a line segment between the white point 350 of the CIE chromaticity diagram 100, through the pixel of interest P1, and ending at the edge of the outermost gamut in the analysis. In this example the outermost gamut is BT. 2020 130, and Point A1 marks the end of the line segment at the edge of the gamut 130. The line segment also includes a point B1, which is the point on the constructed line segment that is at the edge of the BT. 709 gamut 110, which is the gamut of interest for this example, and the gamut illustrated in FIG. 3B.

A rotation/radial angle of the constructed line segment (i.e., the line segment from the white point 350 to A1) may also be measured from a relative starting point or starting line. In the example illustrated in FIG. 3A, the starting line (0 degrees) is a line from the white point 350 and A extending exactly horizontally along the CIE 1931 chromaticity diagram 100. In other embodiments, the starting line may be an imaginary line 352 passing through the white point 350 and through the red primary of the BT. 709 gamut 110, an imaginary line 354 passing through the white point 350 and through the red primary of the DCI-P3 gamut 120, or an imaginary line 356 passing through the white point 350 and through the red primary of the BT. 2020 gamut 130. Note that the starting lines 352, 354, and 356 from the white point 350 through the primary red color of each gamut 110, 120, 130 are slightly different from the starting line extending horizontally through the white point 350. This small offset is due to the red primary of each gamut 110, 120, 130 being in a slightly different location on the CIE 1931 chromaticity diagram 100. Of course, the orientation of the radial reference line is arbitrary, and the relative rotation amount of the constructed line may be measured from any desired starting or reference line. For the illustrated example, the gamut of interest is BT. 709 gamut 110. Providing a relative rotation distance to the user from a base line, in addition to providing a line length distance from a starting point to the pixel of interest, provides a mechanism to singularly identify a pixel of interest to the user. Also, although this embodiment uses a line length and rotation to locate the pixel outside the gamut of interest, other pixel location identifiers could be used, such as a grid system based on a Cartesian plane, or another location system. Note that, with reference to the CIE chromaticity diagram 100, the term "pixel location", or other similar language, refers to the location of the particular color within the chromaticity diagram 100, and not the location of the pixel within the original frame of video that is mapped to the chromaticity diagram, as described above.

In the distance+rotation embodiment described herein, the length measurements, of the line segment from white point 350 to A1, may be performed in a number of ways. One such measurement method is to make a range beginning at the edge of the gamut of interest and ending at the largest gamut represented on the graph. In the illustrated example of FIG. 3A, Point B1 is a 0% reference (i.e., if a color point were located there it would be 0% outside of the gamut of interest), while Point A1 is a 100% reference. In other words, in this measuring method, the location of the point of interest, P1, is measured on a relative scale between 0% and 100%, which reflects the relative distance that the point P1 is between the gamut of interest and the outermost gamut in the CIE 1931 chromaticity diagram 100.

After the line segment through the point P1 is constructed and the relative distance of P1 on that line segment is determined, and after the rotation angle of the line segment is determined, this information may be mapped onto the graph 380 (FIG. 3B) and presented to the user. In this example, only a single pixel, located at P1 on the diagram illustrated in FIG. 3A, is being graphed on FIG. 3B, for ease of explanation as bar 386. The representation of this pixel is illustrated by the bar 386 in FIG. 3B is placed at approximately 120 degrees as measured from the reference line, and the bar graph shows that the pixel is approximately 20% outside of the gamut of interest. In this way, the graph 380 of FIG. 3B conveys significant information about the extent to which the color of the pixel is outside the gamut, i.e., the excursion distance, as well as the color of the pixel itself.

Note that in this example, FIG. 3B is illustrating a pixel color excursion outside of the BT. 709 gamut 110. If instead the DCI-P3 gamut 120 or the BT. 2020 gamut 130 were being analyzed, then, the graph 380 would have no pixels outside the respective gamuts, and the graph 380 would remain blank for the particular frame being analyzed. In practice the graph 380 may be produced for any selected image frame, for any selected gamut, and the operator has a mechanism to manually or automatically step through the individual frames of interest in a video, searching for color violations of the gamut, which appear as bars of varying heights along the Y-axis and locations along the X-axis showing all of the gamut color violations for the particular frame being analyzed. Also, the user has a mechanism to select which gamut 110, 120, 130, or others, for which the graph 380 is produced.

A user may set pre-defined thresholds to ease analysis. Illustrated in FIG. 3B are two such thresholds, Threshold A and Threshold B, on the graph 380 to increase the ease at which the graph 380 conveys information of pixel color excursion outside a particular gamut. Threshold violations by a bar 386 could cause a variety of actions to occur. For instance, when a bar appears on the graph 380 that violates Threshold A, the bar 386 may change color, such as yellow. And, when a bar appears on the graph 380 that violates Threshold B, the bar 386 may change color to red. Threshold violations could instead or additionally be logged in a list, with a frame number, location angle, and percentage of gamut excursion for each gamut violation, which could be reviewed at a later time. The number of thresholds that may be generated is variable, and individual thresholds may be set for each color gamut being analyzed. In other words, the threshold levels need not be the same for all gamuts.

Figure 4:
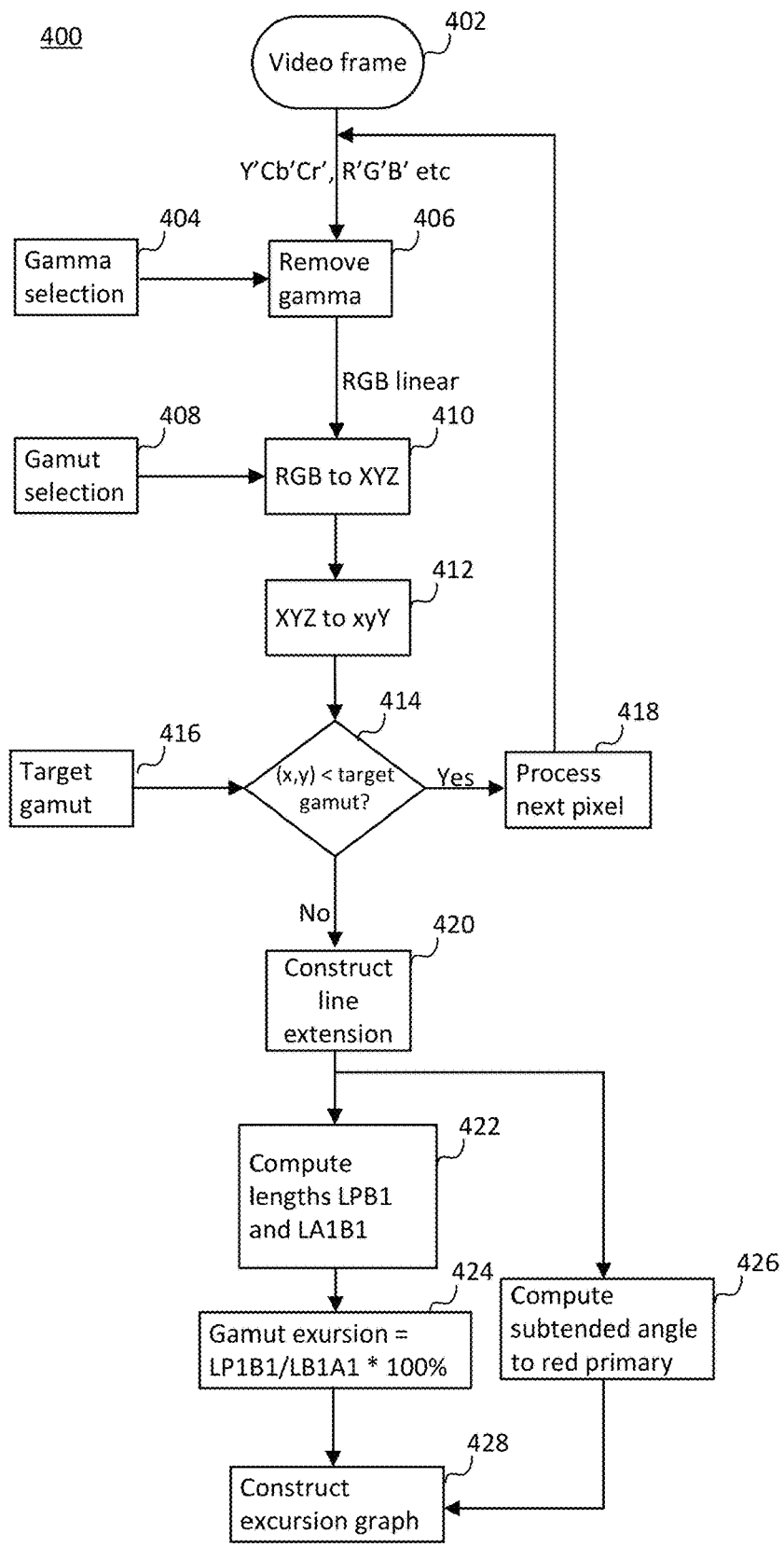
FIG. 4 is a flow diagram illustrating example operations to generate a gamut excursion graph according to embodiments of the disclosure.

FIG. 4 is a flow diagram illustrating example operations of a flow 400 to generate a gamut excursion graph according to embodiments of the invention. The flow begins at an operation 402 when it receives a video frame for processing. The flow 400 receives some information, which may be received from the user or may be pre-set. For example, the flow 400 receives a selection of gamma 404, a selection of gamut 408, and a target gamut 416. Then, the flow 400 proceeds through operations 406 to remove gamma, 410 to convert the color space to XYZ color space, and 412 to convert the color space from XYZ to xyY. The x and y coordinates from the operation 412 may be represented as (x,y), and referred to as the chromaticity coordinate of the particular pixel being analyzed. The operations 402-412 are conventional, and won't be further described. In some embodiments, the operations 402-412 are repeated for all of the pixels in a particular frame, or even in a particular portion of a video made from multiple frames, prior to being analyzed for gamut excursions in operations 414-428.

The operation 414 compares the (x,y) chromaticity coordinate of the present pixel to determine whether it is inside or outside of the target gamut, such as BT. 709. If the (x,y) chromaticity coordinate of the present pixel is located within the target gamut, i.e., within the gamut triangle, then the pixel is ignored on the graph and operation 418 retrieves the next pixel to be processed.

If instead the (x,y) chromaticity coordinate of the present pixel is located outside of the target gamut, such as P1 relative to BT. 709 (110) in FIG. 3A, then the flow 400 continues to operations that build the excursion graph as above described with reference to FIGS. 3A and 3B.

First, a line extension from the white point 350 through the (x,y) chromaticity coordinate of the present pixel is created in an operation 420. In one embodiment the ends of the line are the white point 350 and the boundary of the outermost, i.e., widest, gamut that the gamut of interest is being measured against. In other embodiments the line length may be constructed or referenced differently, such as to other gamuts, or even to the edge of the CIE 1931 chromaticity diagram itself. With reference back to FIG. 3A, the line extends from the white point 350 to A1.

Next, the points of intersection of the constructed line and a) the edge of the gamut of interest; and b) the edge of the gamut of reference, are determined. With reference back to FIG. 3A, these are points B1 and A1, which are the intersections of the constructed line with the BT. 709 gamut 110 and the BT. 2020 gamut 130.

Then, in an operation 422, a relative distance of the point P1 between points B1 and A1 is determined. In other words, how far does the point P1 extend between the points B1 and A1? In the example given with reference to FIG. 3A, the point P1 extends approximately 20% of the distance between B1 and A1. The relative distance may be expressed as a percentage as illustrated in an operation 424. As described below, the relative distance of the excursion of P1 outside the gamut of interest may be calculated in other ways, using other line lengths in the percentage calculation. For example, other relative distance measurements may be used, such as references to a linear or non-linear scale. Thus, the particular reference used to measure the excursion may be implementation specific.

In parallel, a hue angle of the constructed line may be determined in an operation 426. Recall from above that a reference line may be constructed from, for example, a line 352, 354, or 356 passing from white point 350 through the red primary corner of the gamut of interest. Or, the reference line may be a horizontal line that extends from the white point 350 no matter which gamut is being used as the gamut of interest. Also, as mentioned above, the hue angle of the constructed line may be made from any desired line as the radial reference line.

Finally, after the hue angle is determined in operation 426, the information generated in operations 420-426 is graphed for the pixel of interest in an operation 428 to create a representation of the pixel of interest on the graph, such as the graph 380 illustrated in FIG. 3B, and presented to the user.

Note that, in some embodiments, the operations 420-428 are repeated for every pixel in the selected image that is located outside the selected gamut of interest and mapped on a singular graph 380. Therefore, unlike the example of FIG. 3B, the constructed graph for all of the gamut excursions in a video frame will likely contain many data points, likely on the order of hundreds or thousands. The graph may identify the frame number for the particular excursion. In another embodiment, individual graphs, such as 380, may be constructed for each frame in a selected portion of a video. Then, the user could step through the individual graphs 380 to search for gamut violations. In yet other embodiments, only particular graphs 380 for frames that violate any pre-determined thresholds may be generated, including not only Threshold A and Threshold B, but also for any gamut color violation over 0%.

In general, the graph that is constructed according to that as described above helps a user quickly identify various colors that have an excursion outside of the target gamut boundary.

Figure 5:
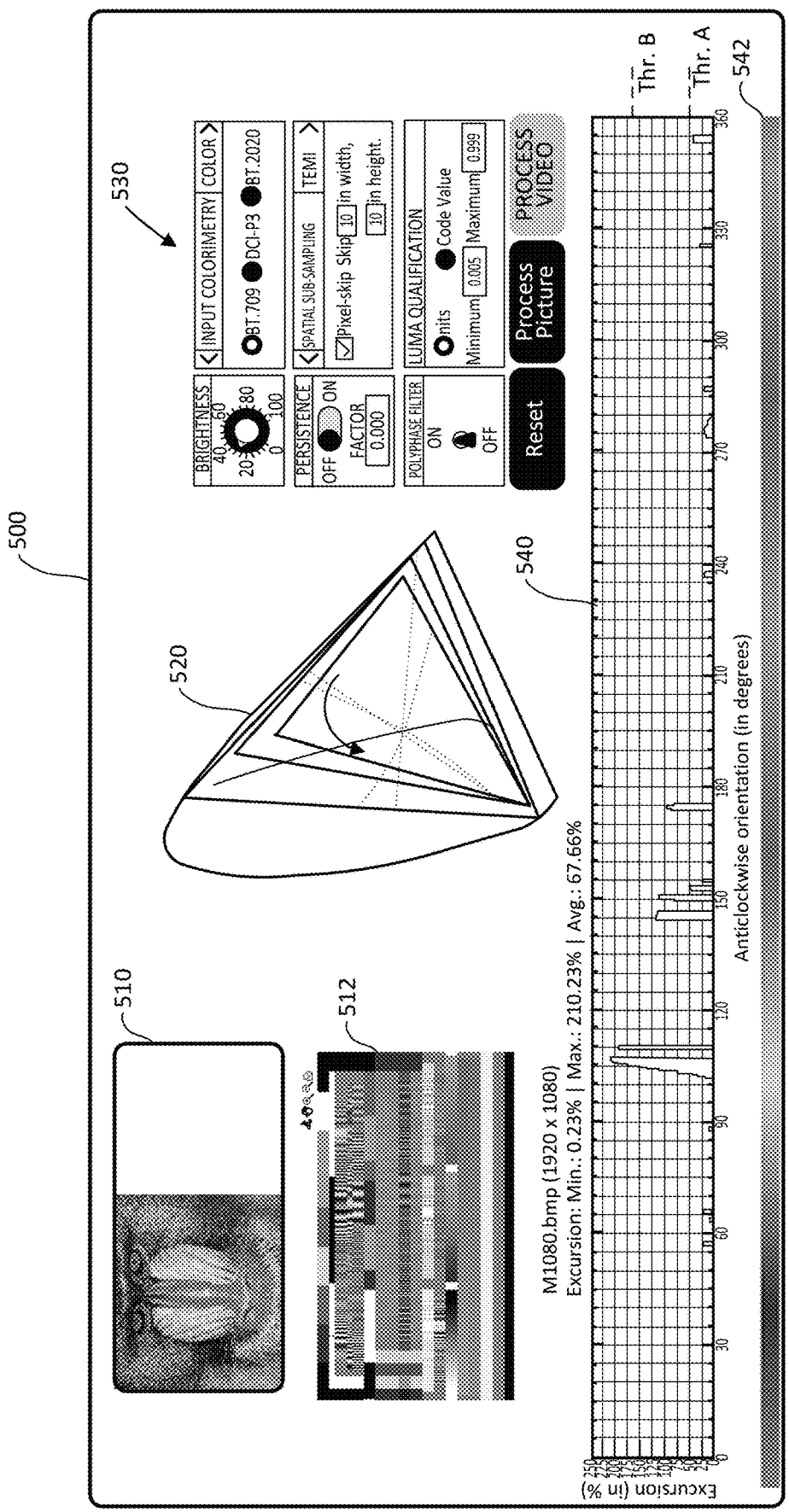
FIG. 5 is a rendering of an example display screen of a measurement device including a gamut excursion graph according to embodiments of the disclosure.

FIG. 5 is an image 500 of a display, also referred to as a display, of a test and measurement device that may be used to generate and show the above-described excursion graph to a user. The image being analyzed is a test image 510, located in the upper-left corner of FIG. 5. A representation of colors 512 of the test image 510 may also be presented on the display. A CIE and gamut graph 520, which is the present state of the art, is illustrated in the top center of the screenshot. The upper-right section of the display provides a user interface 530 through which the user can select the desired gamut, pixel persistence, luma qualifications, etc., to help define what the user will see on a display 540, which may be an embodiment of the graph 380 of FIG. 3B. Along the bottom of the image is an example of the graph in the display 540 created as described above with reference to FIG. 3B. Spikes seen on the display 540 near 105 degrees show that there are green pixels in the test image that fall outside the selected BT. 709 gamut. There are other spikes around 150 degrees and a single spike near 180 degrees. These spikes on the graph of the display 540 alert the user to other color excursions beyond the selected gamut. Threshold A, Threshold B, and others may be set through the user interface 530 or by adding them to the display 540 and dragging them into a desired position. Further, a color bar 542 may be presented below the graph of the display 540 to give a quick reference to the user where the color of the image or video being processed goes beyond the selected gamut. Even further, the graph bars themselves may be presented in the actual colors that exceeded the gamut. Yet further, in some embodiments, pixels within the test image 510 may be modified during processing to produce false colors, or heat maps, with varying intensity related to those pixels of the image that include colors that fall outside of the selected gamut. Pixels of the test image 510 that have colors that fully fall within the selected gamut are not modified. Thus, when a user sees a test image 510 that has many false colors, the user can easily see where the color gamut excursions occur on the test image 510. Although FIG. 5 illustrates the various sections on a black background, the background of any of the sections and graphs may be another color, such as white. Also, not all of the elements of the image 500 need be present in all embodiments of the invention.

The gamut excursion graph concept described above can be applied to any source and target gamut boundaries, including gamuts that are not currently defined. Also, different representations of reference length (the denominator in the ratio of lengths) may be used for measurement of excursions in percentages. For instance, the graph illustrated in FIG. 5 uses a ratio of the distance between points P1 and B1 to a distance between white point 350 and B1 (FIG. 3A). So, in the case as illustrated in FIG. 5, it is possible that the graph height may exceed 100%. In other embodiments, excursion distances may use a non-linear scale. In yet other embodiments, excursion distances, in either a linear or non-linear scale, may be classified into definable excursion zones, so a Level 5 excursion may be a more severe gamut violation than a Level 2 violation. Like mentioned above, any reference may be chosen for either angle or distance without deviating from the scope of the invention, or other mechanisms to identify the pixel outside the chosen gamut may be used.

In some embodiments, the display 500 can be constructed using the 1976 CIE chromaticity diagram rather than the 1931 CIE chromaticity diagram 100 as illustrated herein. The 1976 CIE chromaticity diagram has an added advantage that distances between points on the chart are perceptually linear. That is, using the 1976 CIE chromaticity diagram, equal distances between points will show equal changes in chromaticity, unlike the 1931 CIE chromaticity diagram 100. Of course, other chromaticity diagrams may also be used in other embodiments.

Figure 6:
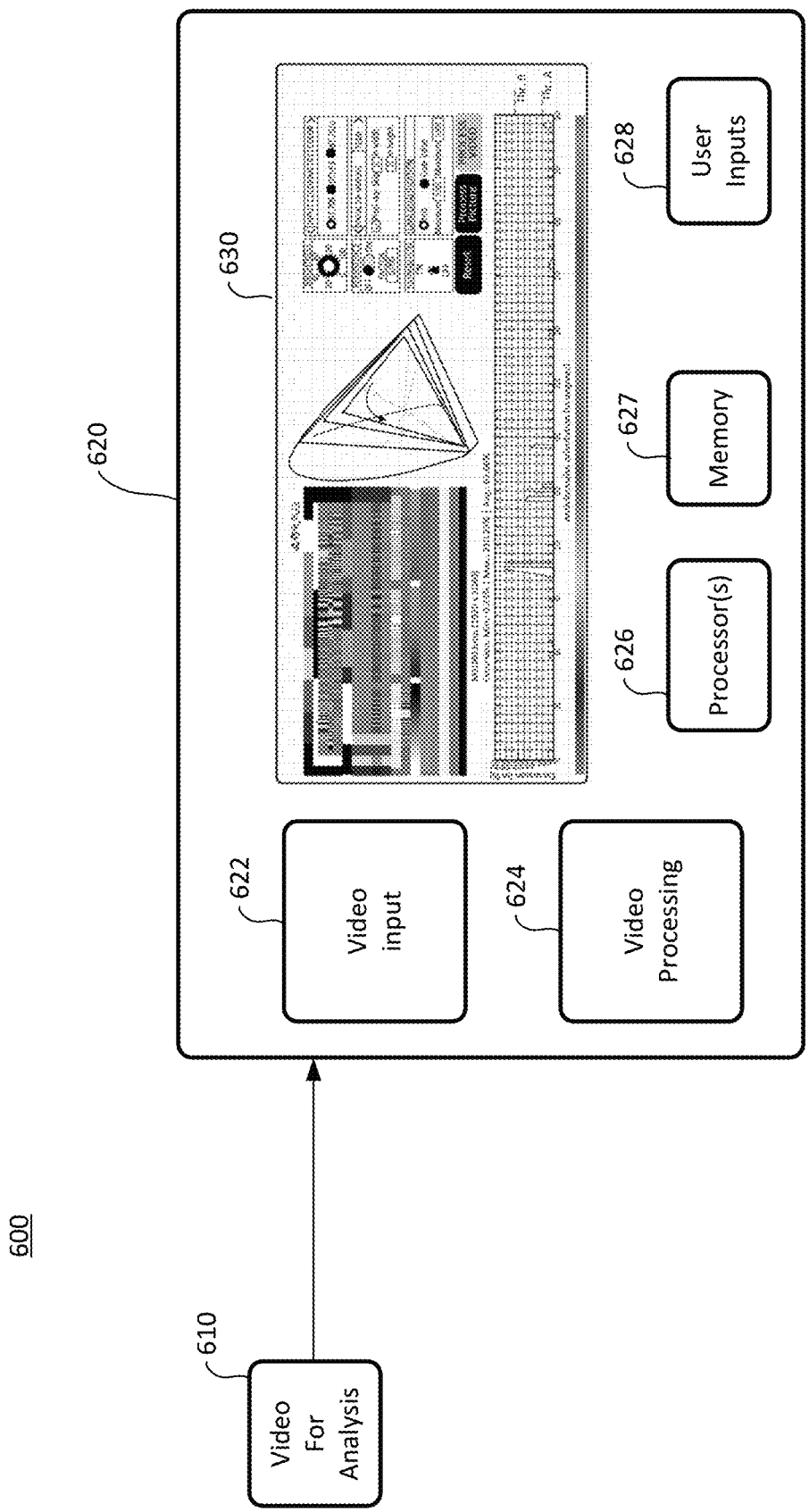
FIG. 6 is a functional block diagram of a test and measurement instrument, such as a video analysis waveform tool, including a system to display gamut excursion according to embodiments of the disclosure.

FIG. 6 is a functional block diagram of a test and measurement system 600 including a test and measurement instrument, such as a video analysis waveform tool, including a system to display gamut excursion according to embodiments of the disclosure. The test and measurement system 600 includes a source 610 for video to be analyzed as well as an instrument 620 for analyzing video, such as a video waveform monitor. The source 610 for the video may transmit the video for analysis through conventional means to the instrument 620, such as through direct video connection or using an Internet Protocol (IP).

The instrument 620 includes a video input 622 for accepting the video from the source 610, as well as a video processor 624 on which embodiments of the invention may operate. In practice, there may be multiple video inputs 622 within the instrument 620 for accepting multiple different streams of video from multiple sources 610.

One or more processors 626 may be separate from the video processor 624, or in some embodiments, the processing functions to operate the instrument 620 and perform the video analysis may be contained within a single processor. In other embodiments the processing functions to operate the instrument 620 and perform the video analysis may be spread across multiple processors, as is known in the art. The one or more processors 626 may be configured to execute instructions from memory 627 and may perform any methods and/or associated steps indicated by such instructions, such as receiving, analyzing, measuring, storing, and displaying results of such operations on a display 630. The display 630 may be the same or similar to the display 500 described with reference to FIG. 5. The memory 627 may be implemented as processor cache, random access memory (RAM), read only memory (ROM), solid state memory, hard disk drive(s), or any other memory type. The memory 627 may also act as a medium for storing video data, computer program products, and other instructions, as is known in the art. The video processor 624 may include its own memory for similar functions, or may be coupled to and operate from the memory 627.

User inputs 628 are coupled to the processor 116. User inputs 628 may include a keyboard, mouse, touchscreen, and/or any other controls employable by a user to set up and control the instrument 620. User inputs 628 may also include a graphical user interface on the display 630, or may be entirely embodied by the display 630. User inputs 628 may further include programmatic inputs from the user on the instrument 620, or from a remote device.

While the components of test instrument 620 are depicted as being integrated within test and measurement instrument, it will be appreciated by a person of ordinary skill in the art that any of these components can be external to test instrument 620 and can be coupled to test instrument in any conventional manner (e.g., wired and/or wireless communication media and/or mechanisms). For example, in some embodiments, the display 630 may be remote from the test and measurement instrument 620, or the instrument may be configured to send output to a remote device in addition to displaying it on the instrument 620. In further embodiments, output from the measurement instrument 620 may be sent to or stored in remote devices, such as cloud devices, that are accessible from other machines coupled to the cloud devices.

EXAMPLES

Illustrative examples of the technologies disclosed herein are provided below. A configuration of the technologies may include any one or more, and any combination of, the examples described below.

Example 1 is a display for showing information from a video frame relative to a selected gamut, the selected gamut including a defined set of colors, the display including an indication of a pixel location for a pixel color in the video frame that exceeds those within the selected gamut, in which the indication of the pixel location includes a location reference that is referenced from a reference point.

Example 2 is a display for showing information from a video frame according to Example 1, in which the reference point is within the selected gamut.

Example 3 is a display for showing information from a video frame according to Example 1 in which the reference point is a white point.

Example 4 is a display for showing information from a video frame according to any of the preceding Examples, in which the indication is an element on a graph including an angular location reference and a distance reference to the pixel location from the reference point.

Example 5 is a display for showing information from a video frame according to Example 4, in which the distance reference is a distance from an outside edge of the selected gamut to the pixel location.

Example 6 is a display for showing information from a video frame according to Example 5, in which the distance is a relative distance of the pixel location between an outside edge of the selected gamut and a second reference point.

Example 7 is a display for showing information from a video frame according to Examples 5 or 6, in which the relative distance is a linear or non-linear representation.

Example 8 is a display for showing information from a video frame according to Example 6, in which the second reference point is an edge of a non-selected gamut.

Example 9 is a display for showing information from a video frame according to Example 6, in which the second reference point is an edge of a chromaticity diagram.

Example 10 is a display for showing information from a video frame according to Example 4, in which the representation is colored to match a color of the pixel color in the video frame that exceeds those colors within the selected gamut.

Example 11 is a display for showing information from a video frame according to Example 4, further comprising a color bar indicating an individual color of the selected gamut for each angular location reference.

Example 12 is a display for showing information from a video frame according to any of the preceding Examples, further comprising a visual representation of the video frame in which colors of individual pixels outside of the selected color gamut appear as falsely colored pixels.

Example 13 is a display for showing information from a video frame according to Example 12, in which colors of individual pixels within the selected color gamut retain their original color.

Example 14 is a video waveform monitor, including an input for receiving a video including one or more video frames, a video processor for analyzing the one or more frames of the video, and a display for showing information from the one or more video frames relative to a selected gamut including a defined set of colors, the display including an indication of a pixel location for a pixel color in the video frame that exceeds those within the selected gamut, in which the indication of the pixel location includes a location reference that is referenced from a reference point.

Example 15 is a video waveform monitor according to Example 14, in which the indication on the display is an element on a graph including an angular location reference and a distance reference to the pixel location from the reference point.

Example 16 is a method of illustrating an amount of gamut excursion of a pixel in a frame of video that has a color that is not within a defined set of colors for a selected gamut, the method including determining a color of a pixel in the frame, evaluating whether the color of the pixel is within the defined set of colors for the selected gamut, generating a location graph, and adding an indication on the location graph for only those pixels of the frame that have a color that is not within the defined set of colors for the selected gamut.

Example 17 is a method according to Example 16, in which the indication on the location graph includes a location reference for each pixel of the frame that has a color that is not within the defined set of colors for the selected gamut.

Example 18 is a method according to Example 16, in which the location reference is an element on the location graph that includes angular location references and distance references from a predefined reference point.

Example 19 is a method according to Example 17, in which the predefined reference point is a color point within the selected gamut.

Example 20 is a method according to Example 17, in which the distance references indicate a scaled distance between an edge of the gamut and a second reference point.

Example 21 is a method according to Example 19, in which the second reference point is an edge of a non-selected gamut.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific aspects of the disclosure have been illustrated and described for purposes of illustration, it will be understood that various modifications may be made without departing from the spirit and scope of the disclosure. Accordingly, the disclosure should not be limited except as by the appended claims.

What is claimed is:

1. A display for showing information from a video frame relative to a selected gamut, the selected gamut including a defined set of colors, the display comprising:
an indication of a pixel location for a pixel color in the video frame that exceeds those within the selected gamut, in which the indication of the pixel location includes constructing a line having a rotation angle indicating the pixel color and a location reference indicating an excursion of the pixel location outside the selected gamut that is referenced from a reference point, and in which the indication is an element on a graph including an angular location reference indicated along a first axis of the graph and a distance reference to the pixel location from the reference point indicated along a second axis of the graph.

2. The display for showing information from a video frame according to claim 1, in which the reference point is within the selected gamut.

3. The display for showing information from a video frame according to claim 1, in which the reference point is a white point.

4. The display for showing information from a video frame according to claim 1, in which the distance reference is a distance from an outside edge of the selected gamut to the pixel location.

5. The display for showing information from a video frame according to claim 4, in which the distance is a relative distance of the pixel location between an outside edge of the selected gamut and a second reference point.

6. The display for showing information from a video frame according to claim 5, in which the relative distance is a linear or non-linear representation.

7. The display for showing information from a video frame according to claim 5, in which the second reference point is an edge of a non-selected gamut.

8. The display for showing information from a video frame according to claim 5, in which the second reference point is an edge of a chromaticity diagram.

9. The display for showing information from a video frame according to claim 1, in which the representation is colored to match a color of the pixel color in the video frame that exceeds those colors within the selected gamut.

10. The display for showing information from a video frame according to claim 1, further comprising a color bar indicating an individual color of the selected gamut for each angular location reference.

11. The display for showing information from a video frame according to claim 1, further comprising a visual representation of the video frame in which colors of individual pixels outside of the selected color gamut appear as falsely colored pixels.

12. The display for showing information from a video frame according to claim 11, in which colors of individual pixels within the selected color gamut retain their original color.

13. The display for showing information from a video frame according to claim 1, in which the graph further comprises:
a color bar extending along the first axis of the graph indicating an individual color of the selected gamut for each angular location reference; and
a bar at the angular location reference for the pixel location, the bar extending along the second axis and indicating excursion of the pixel location outside the selected gamut.

14. A video waveform monitor, comprising:
an input for receiving a video including one or more video frames;
a video processor for analyzing the one or more frames of the video; and
a display for showing information from the one or more video frames relative to a selected gamut including a defined set of colors, the display including an indication of a pixel location for a pixel color in the video frame that exceeds those within the selected gamut, in which the indication of the pixel location includes constructing a line having a rotation angle indicating the pixel color and a location reference indicating an excursion of the pixel location outside the selected gamut that is referenced from a reference point, and in which the indication is an element on a graph including an angular location reference indicated along a first axis of the graph and a distance reference to the pixel location from the reference point indicated along a second axis of the graph.

15. A method of illustrating an amount of gamut excursion of a pixel in a frame of video that has a color that is not within a defined set of colors for a selected gamut, the method comprising:
determining a color of a pixel in the frame;
evaluating whether the color of the pixel is within the defined set of colors for the selected gamut;
generating a location graph; and
adding an indication on the location graph for only those pixels of the frame that have a color that is not within the defined set of colors for the selected gamut, the location graph including a first axis indicating an angular location of the pixel and a second axis indicating an excursion of the pixel outside the selected gamut.

16. The method according to claim 15, in which the indication on the location graph includes a location reference for each pixel of the frame that has a color that is not within the defined set of colors for the selected gamut.

17. The method according to claim 16, in which the location reference is an element on the location graph that includes angular location references and distance references from a predefined reference point.

18. The method according to claim 17, in which the predefined reference point is a color point within the selected gamut.

19. The method according to claim 18, in which the distance references indicate a scaled distance between an edge of the gamut and a second reference point.

20. The method according to claim 19, in which the second reference point is an edge of a non-selected gamut.

* * * * *